United States Patent [19]

Knecht et al.

[11] Patent Number: 4,800,758
[45] Date of Patent: Jan. 31, 1989

[54] PRESSURE TRANSDUCER WITH STRESS ISOLATION FOR HARD MOUNTING

[75] Inventors: Thomas A. Knecht, Eden Prairie; James Ruf, Maple Grove; John P. Schulte, Eden Prairie, all of Minn.

[73] Assignee: Rosemount Inc., Eden Prairie, Minn.

[21] Appl. No.: 877,278

[22] Filed: Jun. 23, 1986

[51] Int. Cl.⁴ .......................... G01L 7/08; G01L 7/10; G01L 9/06

[52] U.S. Cl. ........................................ 73/727; 73/729; 338/4; 338/41; 338/42

[58] Field of Search ................ 73/729, 726, 718, 715, 73/720, 723, 724, 725, 727, 728, 721, 708; 338/4, 41, 42; 361/283

[56] References Cited

U.S. PATENT DOCUMENTS

| | | | |
|---|---|---|---|
| 3,390,579 | 7/1968 | Glattenberg et al. | 73/729 |
| 4,021,766 | 5/1977 | Aine | 338/2 |
| 4,085,620 | 4/1978 | Tanaka | 73/727 |
| 4,168,630 | 9/1979 | Shirouzu et al. | 73/727 |
| 4,295,115 | 10/1981 | Takahashi et al. | 338/4 |
| 4,389,895 | 6/1983 | Rud, Jr. | 73/724 |
| 4,454,440 | 6/1984 | Cullen | 310/313 R |
| 4,527,428 | 7/1985 | Shimada et al. | 73/721 |
| 4,536,820 | 8/1985 | Binder et al. | 361/283 |
| 4,563,697 | 1/1986 | Miura | 357/26 |
| 4,563,903 | 1/1986 | Kohnlechner et al. | 73/727 |
| 4,576,049 | 3/1986 | Kohnlechner | 73/706 |

FOREIGN PATENT DOCUMENTS

| | | |
|---|---|---|
| 039191 | 4/1978 | Japan . |
| U10009 | 1/1979 | Japan . |
| 010329 | 2/1979 | Japan . |
| 0002006 | of 1856 | United Kingdom ................ 73/729 |

Primary Examiner—Donald O. Woodiel
Attorney, Agent, or Firm—Kinney & Lange

[57] ABSTRACT

A pressure transducer has a stress isolator layer which permits the sensor to be non-resiliently mounted (hard mounted) to a mounting surface that in turn is subjected to strain. The strain of the mounting surface tends to induce undesired stress in the sensing diaphragm, and the present stress isolator layer minimizes the amount of stress that is transferred to the measuring diaphragm, to thereby reduce error. The spring preferably comprises a silicon leaf0type spring, with or without isolating slots, and is used in various combinations of diaphragms that are sensitive to pressure. The deflection of the diaphragm in response to pressure can be measured in any desired known manner such as with strain gage resistors, or through capacitive sensing.

12 Claims, 3 Drawing Sheets

PRESSURE TRANSDUCER WITH STRESS ISOLATION FOR HARD MOUNTING

BACKGROUND OF THE INVENTION

1. Field of the Invention

The present invention relates to a pressure transducer that has stress isolating mounting to permit a deflecting diaphragm type sensor to be mounted in direct physical contact with a support surface without being affected by stress or strain on such support surface.

2. Description of the Prior Art

In the prior art various solid state pressure transducers have been advanced which use sensor having deflecting diaphragms for sensing pressures which are capable of being formed by batch processing. It is desired to have solid state sensors made of relatively rigid materials, such as semi-conductor materials, and yet have them "hard mounted" which means they have a mounting surface non-resiliently mounted onto a supporting surface. Difficulty has been encountered in minimizing the effected external strain in the support surface to the sensor, which in turn causes unwanted stress in the measuring diaphragm.

Batch fabrication techniques have been disclosed in the prior art, and are desirable in making semi-conductor pressure transducer assemblies. Making stress isolation members using batch fabricating techniques reduces costs and insures better results.

SUMMARY OF THE INVENTION

The present invention relates to a pressure transducer that is non-resiliently mounted or hard mounted to a support surface subject to deformation, and includes a stress isolator layer that supports the diaphragm and holds the diaphragm in a reference position that is unaffected by stress-induced strain on the support surface mounting the stress isolator layer. The stress isolator reduces the amount of error due to supporting surface stress or strain that would normally appear as a sensor output in a hard mounted sensor, and in this way provides a more accurate output that is directly related to the pressure being sensed.

Various configurations of the transducer can be utilized, but all use a narrow, integrally formed neck on the stress isolation layer and a surrounding rim. The stress isolator layer has a mounting surface used for hard mounting the sensor directly to the support surface. A "leaf spring" section comprises a stress isolating element between the mounting surface and a body on which the diaphragm is supported.

The stress isolator layer can have strain isolating slots or grooves to strain isolate the neck from the rim. The body carrying the diaphragm may be mounted directly to the stress isolator layer or a rigid base layer that resists deflection may be mounted on the stress isolator layer and the body carrying the diaphragm is then attached to the rigid base layer. The sensing diaphragms may also be provided with a covering cup that permits evacuation of a chamber on one side of the sensing diaphragm so that a reference pressure is provided to that side of the diaphragm. The base wall of the cup can dimple in to provide an indication that the vacuum is being maintained in the reference pressure chamber.

The sensing elements on the sensing diaphragms can be strain gage resistors that are formed at appropriate locations on the sensing diaphragm in a known manner, and then connected to suitable circuitry, which is also known. Alternately, the diaphragm may comprise a capacitor plate that is mounted spaced from a second capacitor plate for providing capacitive outputs as a function of diaphragm deflection.

DETAILED DESCRIPTION OF THE PREFERRED EMBODIMENTS

The stress isolator layers of the present invention are made using batch fabrication techniques. A silicon wafer or layer is etched in a conventional manner to form the stress isolation features and then is formed into a sandwich construction with additional layers of suitable material to form the sensors. After forming the wafers or layers they are cut up into individual sensors. Such batch fabricating techniques in general are desirable. The processing techniques presently known include the ability to bond together glass, metals, and semi-conductors such as silicon and other suitable semiconductors together either by anodic bonding or using materials with a glass frit. Suitable epoxies or other types of bonding materials can also be used. Inorganic bonds are preferred for making high performance sensors. In discussing the bonding of layers of materials together, specific forms of bonding will not necessarily be mentioned, but include the known forms described above.

Further, the formation of thinner diaphragm sections in a silicon wafer, with integral rims around the diaphragm edges involves well-known etching techniques. The formation of openings and necks surrounding openings in such wafers by etching or other known techniques is well within the skill of the art.

Figure 1:
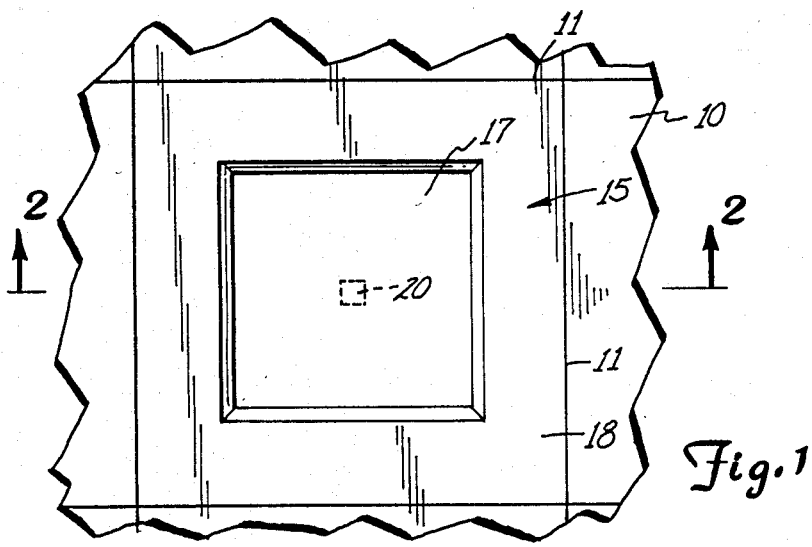
FIG. 1 is a fragmentary view of a typical silicon wafer showing the outline of a batch fabricated stress isolator layer thereon.
Figure 2:
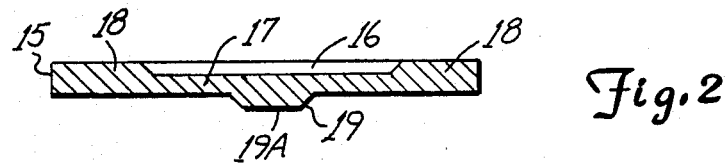
FIG. 2 is a sectional view taken on line 2—2 in FIG. 1.

In FIG. 1, a silicon wafer 10 is shown fragmentarily, and the outer configuration of a stress isolator layer 15 is defined by the peripheral lines 11, which show where the isolator layer is cut out of the wafer after being made up in the necessary layers for making the sensors. This square shape is the outer configuration used with various pressure sensors in batch processing. The isolator layer 15 as shown in FIGS. 1 and 2 is etched on one surface as at 16, to form a thinner leaf spring section 17 extending from the center to an outer peripheral support rim 18. A central post or boss 19 is provided on the lower side of the layer, as shown in FIG. 2, and in most uses will have an opening 20 (shown in dotted lines in FIG. 1) through which pressure can be admitted to the recess 16 on the opposite side of the isolator layer 15. The hole 20 is not shown in FIGS. 2 and 3, but is shown in the rest of the figures.

The etching techniques for forming the post 19 and the recess 16, which in turn forms the thinner leaf spring section 17 is well-known.

Figure 3:
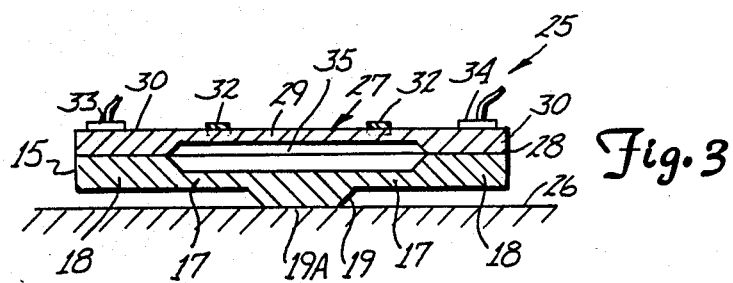
FIG. 3 is a fragmentary sectional view of a sensor having a sensing diaphragm body conforming to the outer configuration of the isolator layer mounted on the isolator layer.

A simple pressure sensor is formed as shown in FIG. 3 at 25 by utilizing the isolator layer 15 (without an opening 20), and the mounting post 19 for supporting the isolator layer 15 onto a support surface 26. A mounting surface 19A on the end of the post 19 is bonded to support surface 26. To form the pressure sensor 25, a diaphragm assembly or body 27 is bonded to the rim 18, as shown at 28. The diaphragm assembly 27 has a thinner center deflecting diaphragm portion 29 that is edge supported on an outer rim portion 30 that aligns with the rim 18. The thinner diaphragm portion 29 has, as shown, piezo-resistance strain gage resistors 32 formed on the surface thereof (by semi-conductor processing techniques such as diffusion, deposition, etching or the like) and suitable contacts and leads 33 and 34 can be taken off from the resistors 32. These leads are connected to suitable circuitry for determining the deflection of the diaphragm portion 29 relative to its reference position. The deflection will cause a change in resistance of the resistors 32 that are formed on the diaphragm portion. The diaphragm assembly 27 is also formed by etching a layer of silicon, quartz, sapphire or other suitable material in selected locations to form the thinner diaphragm portion 29 and the peripheral rim 30. The layers are bonded together before cutting the sensors up along lines 11.

The post or boss 19, as shown in FIG. 3, does not have an opening therethrough, and thus the interior chamber 35 formed by the recess 16 and the recess open to diaphragm portion 29 can be evacuated to provide a reference pressure to one side of the diaphragm 29. The diaphragm portion 29 can sense pressure or forces (such as a supported load) acting on its upper surface as shown in FIG. 3.

The leaf spring section 17 forms a single leaf-type spring (in fact, similar to a Belleville spring) that provides stress isolation so that strain in the support surface 26, which can be a housing wall or the like, will not be transmitted to the diaphragm assembly, but rather the diaphragm assembly will be isolated from load induced by strain in surface 26. "Strain" is used herein to mean external load induced movement of support surface 26 that would result in change in the stress of the diaphragm of a sensor mounted on a layer 15 if the entire undersurface of layer 15 contacted and was supported on surface 26. The boss or neck 19 also serves to isolate the diaphragm from stress, and leaf spring portion 17 further aids in such isolation. The diaphragm assembly 27 forms a body that has an integral diaphragm supported at its edge, and the output varies as a function of the deflection of the diaphragm, as sensed by strain gage resistors 32,32.

Figure 4:
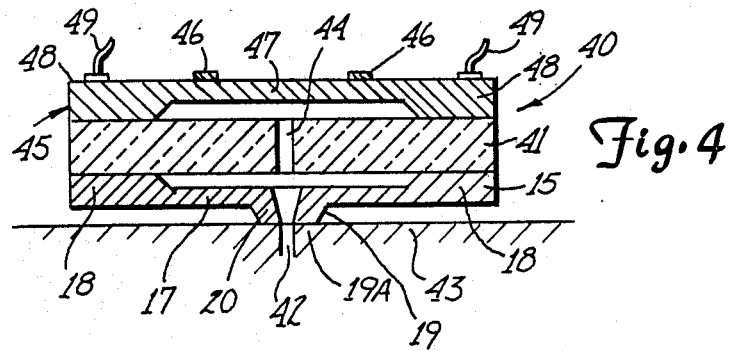
FIG. 4 is a sectional view through a sensor assembly showing a modified form of a sensor mounted onto a modified stress isolator layer.

FIG. 4 shows a modified form of a sensor utilizing the isolator layer 15, again, and as shown in this form, the sensor assembly 40 includes the isolator layer 15 bonded to an intermediate rigid base layer 41. The layer 41 may be made of glass. In this form of the invention the post 19 has the through opening 20, and a pressure opening 42 is provided in the support member 43. The post 19 is fixedly and non-resiliently attached to the support surface of support member 43.

The rim portion 18 of the isolator layer 15 is bonded to the base layer 41. The base layer 41 has a through opening 44. A diaphragm assembly body 45, which is substantially identical to the assembly shown at 25, is bonded to the upper surface of the base layer 41, and has strain gage resistors 46,46 formed on a thinner diaphragm portion 47 which is integrally formed with a peripheral rim 48. The diaphragm portion 47 is of thin enough section so that it will deflect under pressures admitted through openings 42, 20 and 44.

Suitable leads 49 are also provided on this diaphragm assembly 45 to provide signals to sensing circuitry.

The stress isolator layer 15 includes the post or boss 19 and the leaf spring section 17 that will deflect when strain in the support surface 43 tends to cause the deflection of the mounted sensor assembly. The rigid base layer 41 attached to rim 18 tends to rigidify the isolator layer 15 by supporting it near the periphery, and further insures that external stresses will not be transferred to the diaphragm 47.

Pressure acting on the diaphragm 47 through openings 42, 20 and 44 will cause it to deflect. This deflection will cause a change in the strain sensing resistors 46 to provide a sensor output.

Figure 5:
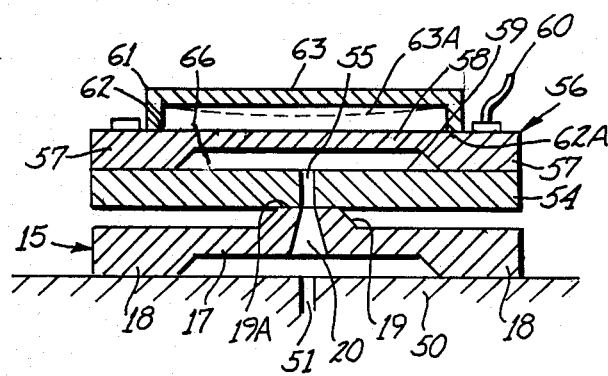
FIG. 5 is a sectional view of a sensor taken showing a further modified form thereof using the stress isolator layer made according to the present invention inverted from FIG. 4.

FIG. 5 shows a further modified form of a sensor. In FIG. 5, the stress isolator layer 15 is inverted from that shown in FIG. 4, and the rim portion 18 of the stress isolator layer has a surface comprising a mounting surface bonded to a support surface 50, which also has a through opening 51 for passage of pressure to be sensed. The rim 18 of isolator layer 15 forms a peripheral support and the leaf spring portion 17 is spaced from the support surface 50 and is supported relative to the support surface 50 through the rim 18. The post or boss 19 having through opening 20 extends upwardly as shown in FIG. 5, and has a rigid base layer 54 bonded to the outer end mounting surface 19A of the post 19. The base layer 54 may be glass and has a central opening 55 for pressure to be sensed and a diaphragm assembly 56 constructed substantially similar to the diaphragm assemblies 45 and 25 has an outer rim 57 bonded to the base layer 54. The deflecting diaphragm portion 58 is a thinner portion integrally formed with the rim 57 using suitable techniques. Suitable leads such as 60 connect the deflection sensing strain gages to suitable circuitry.

In this form of the invention, the deflecting diaphragm portion 58 has an optional indicator cup 61 mounted thereon. The indicator cup 61 has a peripheral wall 62 and a central or base wall 63 that is relatively thin and which will deflect under pressure. When the edge of the peripheral wall 62 is bonded to the surface of the diaphragm assembly 56 as at 62A, the cup 61 forms a sealed chamber 63A. When the cup is bonded in place in a vacuum, the overlying base wall 63 of the cup 61 will deflect downwardly from atmospheric pressure as shown exaggerated in dotted lines in FIG. 5 to provide an indication that there is a vacuum in the chamber 62A formed underneath base 63 and surrounded by the wall 62. This vacuum indicator cup 61 is a separate member that also tends to rigidify the sensor assembly because of the support provided by the wall 63 above the diaphragm rim 57. This further aids in stress isolation of the diaphragm. A reference pressure is also established in chamber 63A and acts on the enclosed surface of the deflecting diaphragm portion 58, so that any pressure in the sensing chamber 66 surrounded by the rim 57, and formed with respect to the base layer 54 will be sensed with respect to a reference pressure. It can be determined that the reference pressure exists when it is seen that the base 63 is indented.

Any deflection of the diaphragm portion 58 from pressure in chamber 66 (coming through opening 51) will be sensed by the strain gage resistors 59, and by suitable circuitry connected to the leads 60. The mating surfaces of rim 18 and support 50 can be bonded together with known techniques so that there is a hard mounting to the support surface 50. The leaf spring portion 17, supported through the rim 18, and the post 19 of the isolator layer 15 will thus isolate stresses caused by strains in support 50 from acting on the sensing diaphragm portion 58.

Figure 6:
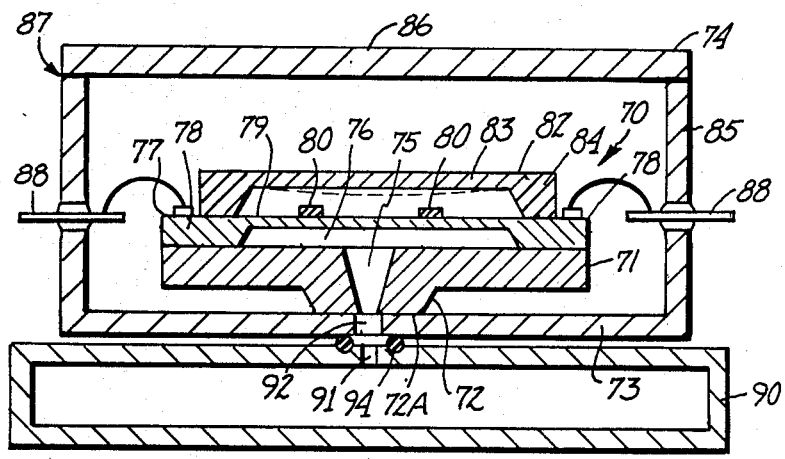
FIG. 6 is a transducer assembly showing a typical application of a sensor mounted on a pressure manifold, including a further modified form of the sensor utilizing the stress isolator layer of the present invention.

FIG. 6 illustrates a typical transducer assembly of a sensor in an outer housing which is mounted relative to a pressure manifold. The sensor assembly 70 is similar to the sensor body shown in FIG. 3, and includes a stress isolator layer 71 having a stress isolation post or boss 72 with an end mounting surface 72A hard mounted to the base 73 of a sensor housing 74. An opening 75 through the post 72 opens to a pressure sensing chamber 76. A diaphragm assembly or body 77 is mounted onto the isolator layer 71 at the rim portion 78 of the diaphragm assembly, in a suitable manner. The diaphragm assembly 77 includes a deflecting diaphragm portion 79, having strain gage resistors 80 thereon for sensing movement of the deflecting diaphragm portion. A vacuum indicating cup 82 is mounted over the diaphragm portion 79, and the cup 82 has a base wall 83 that is the indicating wall, and a peripheral wall 84 that has its edge bonded to the diaphragm assembly 77 in alignment with rim 78. When the wall 84 of cup 82 is fused or bonded to the diaphragm assembly 77 under vacuum, the cup wall 83 will deflect inwardly under atmospheric pressure as shown in dotted lines.

Thus, there is an indication that when the reference pressure in the chamber underneath the base wall 83 is a vacuum.

The housing base wall 73 has a peripheral housing wall 85 fixed thereon and a cover 86 forms an enclosure 87 surrounding the sensor assembly 70. Suitable electrical feedthrough connections indicated at 88 can be mounted in the housing 74, for connection from the resistors 80 to suitable sensing circuitry.

As shown, the housing base wall 73 is mounted onto a pressure manifold 90 that carries a pressure to be sensed, and has a pressure outlet opening 91 leading to an opening 92 in wall 73 aligning with the opening 75 in the stress isolator layer 71. A suitable 0-ring 94 can be used for sealing the aligning openings 91 and 92.

Therefore, when pressure is present in the manifold 90, it will be passed into the sensing chamber 76 and deflect diaphragm portion 79 relative to the reference pressure formed by the cup 82.

Any stresses on the sensor housing base 73 are isolated from the diaphragm by the isolator layer 71, and in particular the isolation provided by the neck 72, which is coupled to the diaphragm rim 78 through an intermediate portion 72A of the isolator layer.

FIGS. 7-10 show further modified forms of a stress isolator layer made with batch fabrication methods. These involve isolator layers that act substantially in the same manner as previously described but Which are formed with strain isolating slits that provide spring or hinge sections for stress isolating the mounting post or boss from the sensing diaphragms.

Figure 7:
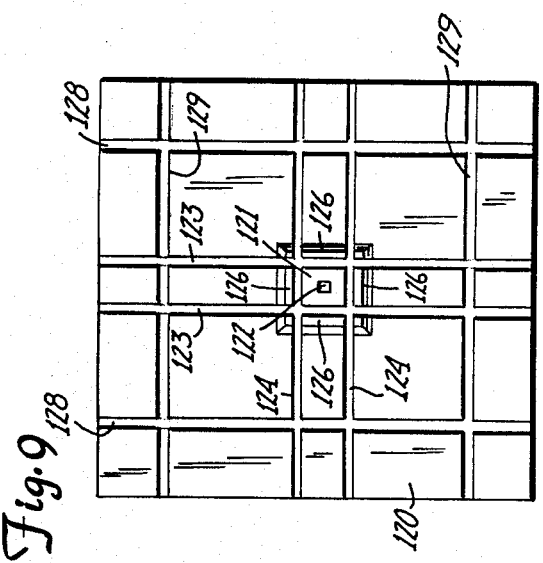
FIG. 7 is a bottom view of a typical stress isolator layer including isolation grooves therein.

In FIG. 7, a bottom view of an isolator layer 100 is shown, and it is formed from a silicon wafer as previously described. In forming, a boss 101 is made in the center portion, with a suitable pressure opening 102. A pair of spaced apart parallel isolating slits or slots 103 are formed in the surface of the layer 100 and extend part way through the layer. A pair of intersecting slits or slots 104, extending in a direction perpendicular to the slots 103 are also formed in the bottom surface of the isolator layer. The slots form a peripheral isolator slot to isolate the center section of the isolator layer indicated at 105 that surrounds the post 101. The post or boss 101 is connected to the rest of the isolator layer only through a spring hinge portion 106 that is substantially reduced in thickness from the rim portion 107 of the isolator layer 100 (see FIG. 8).

Figure 8:
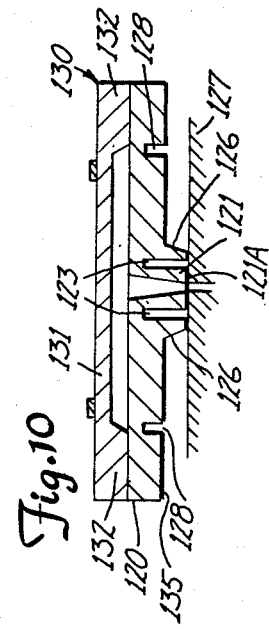
FIG. 8 is a sectional view of a sensor utilizing the stress isolator layer shown in FIG. 7.

In FIG. 8 the post or boss 101 is extending downwardly and a diaphragm assembly or body 110 has a thinner deflecting diaphragm portion 111 and an integral rim 112. The rim 112 is bonded to the peripheral rim 107 of the isolator layer 100. If desired a suitable vacuum indicating cup can be provided over this diaphragm assembly or body as shown previously.

In this form of the invention, the diaphragm assembly has strain gage piezo-resistors 113 formed thereon to sense diaphragm deflection in a known manner. Suitable leads 114 are connected to resistors 113 and connected to suitable sensing circuitry.

The post 102 has a mounting surface 102A which is hard (non-resiliently) mounted onto a suitable support surface 115 which may be subjected to strains, but the strain induced stresses in the diaphragm 111 will be isolated from the diaphragm 111 due to the isolation slots 103 and 104 that isolate the post or boss 101 from transmitting stress to the diaphragm. The narrow section 106 acts as a spring hinge to the post 102 and can move without transmitting stresses to the diaphragm that affects the value of the resistors 113.

Figure 9:
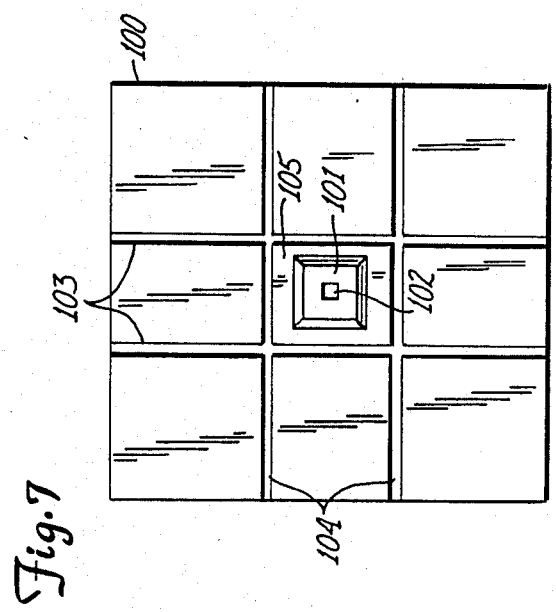
FIG. 9 is a bottom plan view of a stress isolator layer made according to a further modified form of the invention with additional isolation grooves formed therein.

FIG. 9 shows a further modified form of a stress isolator layer comprising an isolator layer 120 made from a silicon wafer, and having a central post or boss 121. The boss 121 is formed as before with an opening 122 therein for admission of pressure into a sensor assembly. A pair of parallel, spaced isolating slots or slits 123 extending in a first direction define two sides of the post, and a second pair of slots or slits 124 extending in a second perpendicular direction define the two opposite sides of post 121 to form an encircling groove 125. The slots 123 and 124 defining the post separate out four walls 126 that are part of the boss initially formed by etching, but separated out when the slots are made. The slots are usually cut with a saw after the isolator layer is etched. When the stress isolator layer 120 is mounted onto a support surface 127 (FIG. 10) it is supported in two areas, one directly on the end surface 121A of post 121, and also on the ends of surrounding walls 126.

Isolating slots 128 are formed parallel to slots 123 and spaced out toward the periphery to provide further isolation for the outer edge portions of the isolator layer. Slots 129 are parallel to slots 124 and spaced outwardly from the slots 124. The slots 128 and 129 form flexible or spacing isolator sections between the boss 121 and the rim portion 135 formed by slots 128 and 129.

Figure 10:
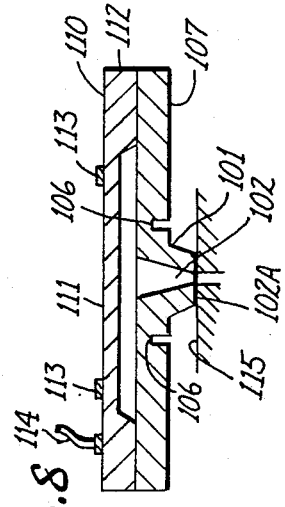
FIG. 10 is a sectional view through the center of the stress isolator layer shown in FIG. 9 with a sensing diaphragm body mounted in place to form a sensor.

When a diaphragm assembly 130 is mounted on layer 120 as shown in FIG. 10, so that the deflecting diaphragm 131 will deflect relative to the isolator layer under pressure, any strain in the support surface 127 will be isolated from the diaphragm and will not substantially affect the sensing output of the sensing diaphragm portion. Sensing diaphragm assembly 130 includes a rim 132 which is bonded to an upper surface of rim 135 of the isolator layer. The isolator grooves 128 and 129 at the outer edges of the isolator layer are positioned just inside the rim 132, as shown in FIG. 10. The slots form reduced thickness sections that provide the needed resilient or spring effect for stress isolation.

The cuts shown in FIGS. 7-10 can be made with a saw, but chemical etching after mechanical sawing might be advisable to eliminate microcracks in the bottom ends of the cuts that are shown. The construction disclosed in FIGS. 7-10 has the spring sections to reduce transfer of strain induced stress between the mounting boss and the diaphragm rim.

The rims are maintained rigid, while deflection between the rims and the supporting surfaces for the isolator layer is permitted. Where a boss or post supports a layer of uniform thickness, as shown in FIG. 6, the post or boss dimensions are selected to permit it to flex and provide isolation of stresses to prevent mounting induced stress from affecting the diaphragm.

Capacitive or resistive sensing techniques can be used for the deflecting diaphragms, and the stress isolation for hard mounted sensors is achieved in a simple manner.

The sensors are relatively small, and using batch fabrication techniques, as many as 200 devices can be made out of a three-inch wafer that is stacked or sandwiched with additional layers as needed to provide sensing diaphragms, and intervening glass layers if desired.

What is claimed is:

1. A pressure sensor comprising:
   a mounting surface;
   a first body having a diaphragm with a diaphragm rim supported by an edge support surrounding a deflectable region which is otherwise free of support and which is responsive to the pressure;
   means disposed on the diaphragm for providing an output which varies as a function of deflection of the diaphragm; and
   stress isolation means connected between the mounting surface and the edge support of the first body for supporting the first body and preventing transmission of stress from the mounting surface to the diaphragm, said means for providing an output further comprising a layer disposed on the diaphragm which is substantially free of mechanical coupling to any portion of the pressure sensor other than the diaphragm such that the deflectable region of the diaphragm is substantially isolated by the stress isolation means from mechanical stress at the mounting surface.

2. The pressure sensor of claim 1 wherein the stress isolation means comprises a layer of material supported on a centrally located boss extending from a first surface of the layer, a peripheral edge portion, and a deflectable portion between the boss and the edge portion.

3. The pressure sensor of claim 1 wherein said stress isolation means comprises a layer of material having a boss extending therefrom, the edge of the first body being supported on said stress isolator layer at an edge spaced from said boss, said boss having a boss surface defining the mounting surface, said stress isolation means being configured to have a resilient spring portion between the boss surface and the edge supporting the first body.

4. The pressure sensor of claim 1 wherein said stress isolation means comprises a leaf spring portion.

5. The pressure sensor of claim 3 wherein said layer of material has a peripheral rim portion substantially aligning with the edge supporting the diaphragm portion of the first body, and leaf spring means formed between the boss and the peripheral rim portion of said stress isolation layer of material.

6. The pressure sensor of claim 1 wherein said stress isolation means comprises a first stress isolation layer comprising a layer having a rim portion extending from one surface thereof, and a boss portion extending from the other surface thereof, said rim portion extending substantially around the periphery of said stress isolation layer and the boss portion being located substantially in the center of said stress isolation layer, leaf spring means connecting the rim portion and the boss portion for providing resilient compliance between the rim portion and the boss portion, one of said portions comprising said mounting surface, and said first body being mounted to the other of said portions.

7. The pressure sensor of claim 6 wherein said first body comprises a rigid layer of material, and a separate diaphragm layer mounted on said rigid layer, said diaphragm layer having a rim that supports the diaphragm portion in a spaced relation from said rigid layer.

8. The pressure sensor of claim 1 wherein the means forming a mounting surface comprise a boss extending from a first surface of the stress isolator layer, and the stress isolator layer comprising a peripheral rim portion, and a deflectable portion between the boss and the rim portion.

9. A pressure sensor comprising:
   a first body including a diaphragm with a diaphragm rim supported by an edge support surrounding a deflectable region which is supported only by the rim and which is responsive to the pressure;
   means disposed on and supported only by the diaphragm for providing an output which varies as a function of deflection of the diaphragm with respect to the edge support from a rest position; and
   a stress isolator layer having a peripheral edge and means forming a mounting surface for supportively connecting the edge support of the first body to a support surface, said stress isolator layer including a spring section between its peripheral edge and the means forming a mounting surface for reducing transmission of stress from the mounting surface to the diaphragm said means for providing an output further comprising a layer disposed on the diaphragm which is substantially free of mechanical coupling to any portion of the pressure sensor other than the diaphragm, the deflectable region of the diaphragm thereby being substantially isolated from mechanical stress by the spring section.

10. A pressure sensor comprising:
    a mounting surface;

a first body having an edge supported diaphragm portion;

means for providing an output which varies as a function of deflection of the diaphragm portion; and stress isolation means for preventing transmission of stress from the mounting surface to the diaphragm portion comprising a stress isolation layer of material having a boss extending therefrom, the edge of the first body being supported on said stress isolation layer at an edge spaced from said boss, said boss having a boss surface defining a sensor mounting surface, said stress isolation means being configured to have a resilient spring portion in a reduced thickness section of the layer formed by slots extending partially through the layer and surrounding the boss between the boss surface and the edge supporting the first body.

11. A pressure sensor comprising:

a first body comprising a rigid layer and a diaphragm layer mounted on the rigid layer, the diaphragm layer having an edge supported diaphragm and a rim supporting the diaphragm spaced from the rigid layer;

a cup member overlying said diaphragm layer on a side thereof opposite the rigid layer, and having a peripheral wall substantially aligning with the support rim of said diaphragm, and having a base wall spaced from the diaphragm;

means for providing an output which varies as a function of deflection of the diaphragm; and stress isolation means for preventing transmission of stress from a mounting surface thereon to the diaphragm comprising a stress isolation layer having a rim portion extending from one surface thereof and extending substantially around the periphery thereof, and a boss portion extending from the other surface thereof and located substantially in the center thereof, and leaf spring means connecting the rim portion and the boss portion for providing resilient compliance between the rim portion and the boss portion, one of said portions comprising said mounting surface ®, and said first body being mounted to the other of said portions.

12. A pressure sensor comprising:

a first body including an edge supported diaphragm portion;

means for providing an output which varies as a function of deflection of the diaphragm portion from a rest position;

a stress isolator layer having a peripheral edge and means forming a mounting surface for connecting the first body to a support surface comprising a boss extending from a first surface of the stress isolator layer, a peripheral rim portion, and a deflectable spring section between its peripheral edge and the means forming a mounting surface for reducing transmission of stress from the mounting surface to the diaphragm portion; and a cup member overlying said diaphragm portion on a side thereof opposite from the stress isolator layer, said cup portion having a peripheral wall substantially aligning with the edge supporting said diaphragm portion and sealingly bonded to the first body, and having a base wall spaced from said diaphragm portion, said cup portion base wall being deflectable toward said diaphragm portion when the space between the cup portion base wall and the diaphragm portion is under vacuum.

* * * * *